Aug. 20, 1957  S. B. PICKLES ET AL  2,803,821
RADIO NAVIGATION RECEIVER
Filed Aug. 10, 1954  2 Sheets-Sheet 1
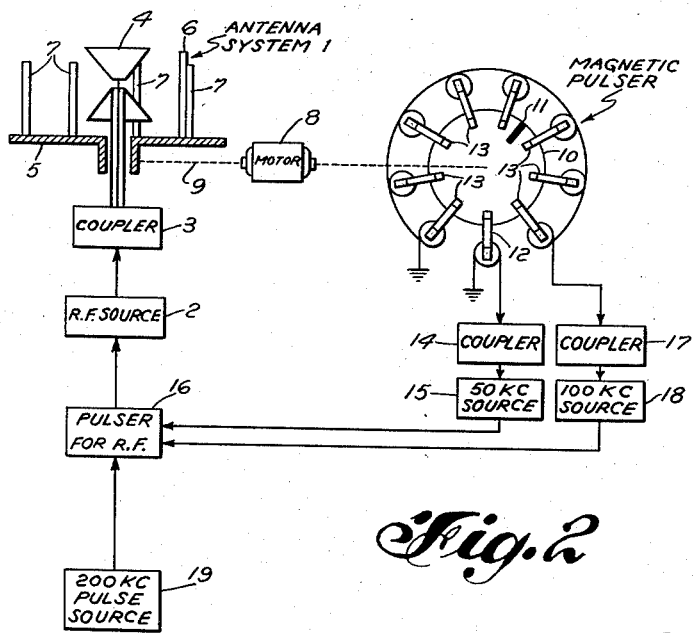
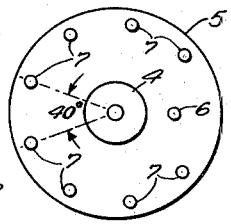
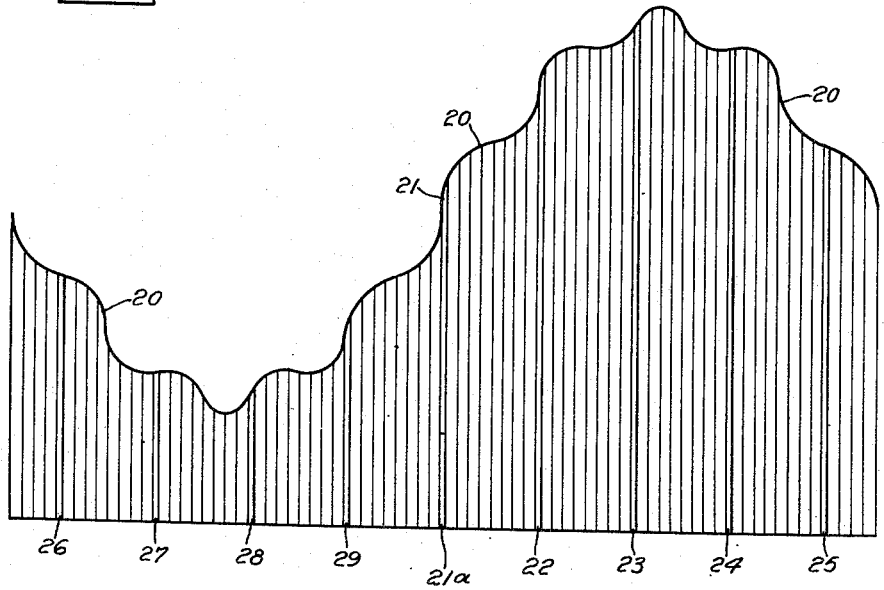
INVENTORS
SIDNEY B. PICKLES
MARK A. KARPELES
BY
Ernest Lanwick
ATTORNEY

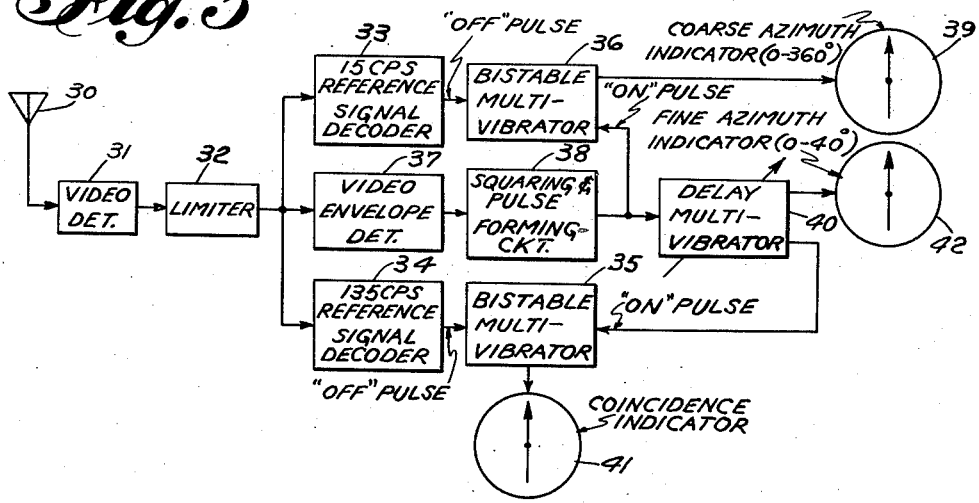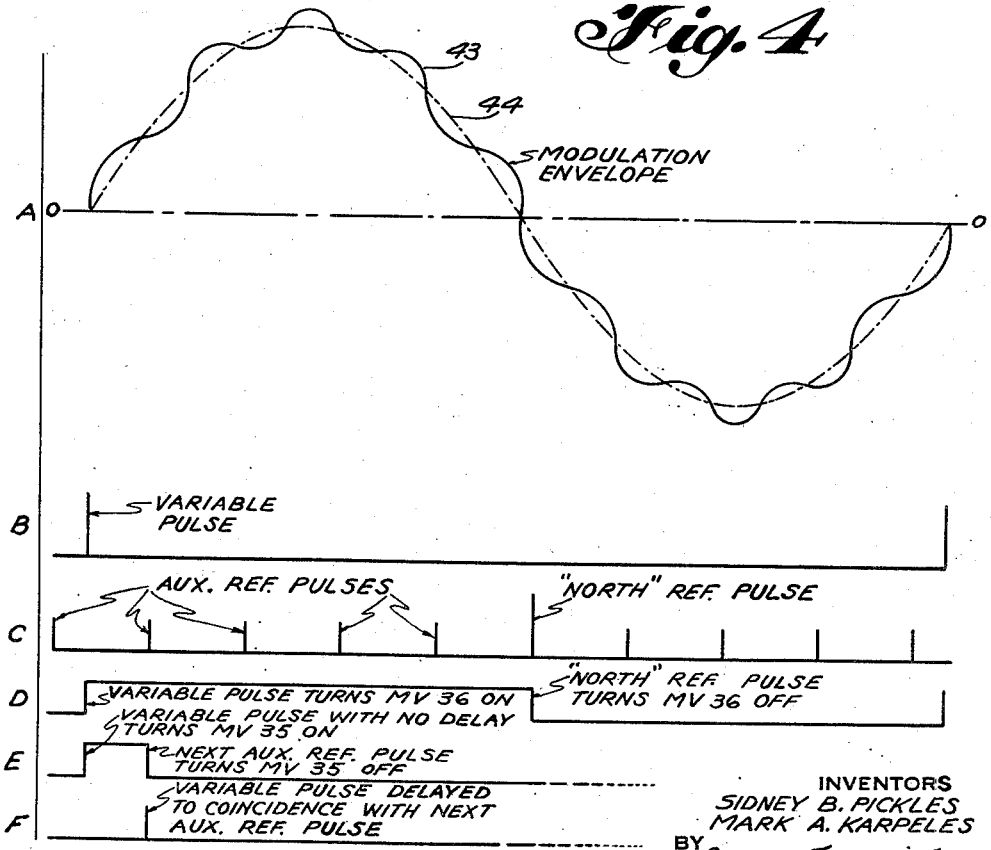

United States Patent Office 2,803,821
Patented Aug. 20, 1957

2,803,821

RADIO NAVIGATION RECEIVER

Sidney B. Pickles, Monterey, Calif., and Mark A. Karpeles, White Plains, N. Y., assignors to International Telephone and Telegraph Corporation, Nutley, N. J., a corporation of Maryland Application August 10, 1954, Serial No. 448,952

6 Claims. (Cl. 343—106)

This invention relates to radio navigation receivers and more particularly to radio navigation receivers for use in cooperation with omni-range beacons of the type which transmit rotating directional radiation patterns having a complex sinusoidal characteristic and reference signals at a fundamental and harmonic frequency.

One type of omni-range beacon for use as a radio navigational aid radiates a rotating directional pattern having a sinusoidal characteristic at a fundamental frequency which is supplemented by a second sinusoidal characteristic at a frequency harmonically related to the fundamental. Along with the fundamental and harmonic sinusoidal characteristic signals there are transmitted a reference signal at the fundamental frequency and reference signals at a frequency harmonically related to the fundamental frequency, each time the directional pattern is in a predetermined position such as "north." The phase of the fundamental frequency component of the received waveform is directly proportional to the receiver's direction or bearing from the omni-range beacon and may be determined by comparing the fundamental frequency component signal phase with a reference phase. The phase of the harmonic component varies at a faster rate depending upon which harmonic is utilized, and this may be utilized to yield a "fine" or more accurate phase measurement. In order to establish fixed references for the phase determination of the bearing signals the beacon is arranged to radiate specially coded reference signals in addition to the bearing signals, namely, a "north" reference signal, once per rotation of the directional radiation pattern and harmonic reference signals at the harmonic frequency. At the receiver the phase of the fundamental component of the bearing signal is compared with the phase of the fundamental reference signal or north signal and this phase difference is proportional to the airplane's bearing from the ground station. A comparison at the fundamental frequency usually yields a coarse indication. A similar measurement is performed utilizing phase comparison of the harmonic frequency component of the bearing signal and the harmonic frequency reference signals which results in bearing information with an increased accuracy, but having an ambiguity. The harmonic information yields a fine indication and the ambiguity is resolved because of the coarse measurement.

Usually such navigational aids are utilized by aircraft and thus the receiver portion must be made simple and of light weight. Previous systems known to the prior art have usually required the receiver to separate the fundamental and the harmonic frequency bearing signals and compare them individually in separate circuits with the fundamental and harmonic frequency reference signals. Obviously, such a receiver system required a complexity of detector circuits for recognizing the various transmitted signals and each circuit added weight to the receiver system. It is, of course, essential that any reduction in weight not be accompanied by the equivalent reduction in accuracy or the purpose of reducing the weight of the receiver is defeated.

Thus, one of the objects of this invention is to provide an extremely accurate radio navigation receiver for use with an omni-range beacon which is extremely light in weight.

Another object of this invention is to provide a radio navigation receiver in which the time spacing between a plurality of series of reference pulses and the zero voltage crossover of the modulation is measured to obtain a coarse and a fine determination of azimuth of the receiver from the beacon.

A feature of this invention is the provision of a radio navigation receiver for use in a radio beacon system in which an omni-range beacon transmits a directional radiation pattern rotating at a fundamental frequency and also transmits fundamental and harmonically related reference signals. The receiver of this invention detects the energy radiated by the beacon and separates the fundamental and harmonic reference signals. The phase of the fundamental reference signal and the fundamental frequency component of the envelope wave of the transmitted signal are compared to yield a coarse indication. The time elapse between a pulse produced by the zero voltage axis crossing of the modulation and the next occurring harmonic reference signal is measured in order to obtain a fine indication of bearing of the receiver from the beacon.

The above-mentioned and other features and objects of this invention will become more apparent by reference to the following description taken in conjunction with the accompanying drawings, in which:

Fig. 1A is one embodiment of an omni-range beacon for use in cooperation with the radio navigation receiver of our invention;

Fig. 1B is a plan view of the antenna system shown in Fig. 1A;

Fig. 2 is a graphic illustration of one type of radiation pattern emitted by the beacon shown in Fig. 1A plotted on rectangular coordinates;

Fig. 3 is a schematic diagram in block form of one embodiment of the radio navigation receiver of our invention; and Fig. 4 is a graphic illustration of a group of curves helpful in the explanation of this invention.

Referring to Fig. 1 of the drawing, a schematic circuit diagram, partly in block form, of one embodiment of an omni-range ground beacon for use in cooperation with the radio navigation receiver of this invention is shown. The omni-range beacon transmitter is provided with an antenna system 1 to which is applied a carrier frequency, for instance, 1,000 megacycles, from radio-frequency source 2 through antenna coupling unit 3. The antenna system 1 includes a fixed omni-directional antenna 4 which, for purposes of explanation, is shown as a single unit, it being understood that a vertical stacked antenna array may be used to increase the vertical concentration of energy. On a disk 5, mounted in spaced relation to antenna 4 is a reflector element 6 and disposed about the periphery of disk 5 are a plurality of symmetrically arranged reflectors 7. The disk 5 is rotated at a desired speed, for example 15 revolutions/second by a motor 8 and mechanical linkage 9. Thus as energy is applied to antenna 4 the rotating reflector 6 distorts the radiated pattern to form a fundamental bearing signal at the receiver having a frequency equal to the frequency of rotation of disk 5 and reflectors 7 of which there are 8 in addition to reflector 6 spaced at 40 degree intervals, provide a signal which is harmonically related to the frequency of the fundamental signal, and, for example, in this illustration will occur at a frequency of 135 cycles/second. The motor 8 drives disk 10 composed of a non-magnetic material, in synchronism with disk 5 to provide pulses for furnishing the reference signals. Disk 10 has a slug 11 composed of a magnetic material embedded in its surface so that the slug 11 passes between the pole faces of magnetic pickup unit 12 each time reflector 6 is in a predetermined position, such as north, a pulse is produced. The metallic slug 11 also passes between the pole faces of the magnetic pickup units 13 each time a reflector 7 is in a predetermined position. Output energy from magnetic pickup device 12 is applied through coupler 14 to key an R. F. source 15, for example, a 50 kc. source, which supplies through pulser 16 bursts of energy to R. F. source 2 to the antenna 4 at the 50 kc. rate. Pickup units 13 serve through coupler 17 and 100 kc. source 18 to supply antenna 4, 100 kc. bursts of energy through pulser 16 and R. F. source 2 so that these bursts of pulses are transmitted over antenna 4 for each passage of the metallic slug 11 through a pickup unit 13. Thus, each time a reflector 6 or 7 is aligned in a desired direction, pulses of reference frequency energy are transmitted. A pulse source 19 controls pulser 16 to provide energy from source 2 to the antenna 4 in the absence of any signals from sources 15 or 18.

Referring to Fig. 2, the signals emitted by the beacon shown in Fig. 1A are graphically illustrated. It is seen that the envelope wave 20 has a fundamental frequency at 15 cycles per second, one cycle of which is shown in Fig. 2, point 21 in the cycle being an indication when the directional radiation pattern is facing due north, and at which time a north reference signal 21a is radiated. The harmonic bearing signal at 135 cycles per second is shown by the undulations of the fundamental bearing signal, nine cycles of the harmonic signal being illustrated in Fig. 2. At the start of each harmonic cycle a harmonic reference signal is transmitted as indicated at 22—29. Due to the timing, the north reference signal 21a functions as both a harmonic reference signal and a fundamental reference signal. It should of course be pointed out that there are many radio navigation beacons possible which are capable of transmitting a complex bearing signal having a fundamental frequency along with fundamental and harmonic frequency reference signals. The beacon shown in Fig. 1A is given by way of example only.

Referring to Fig. 3 of the drawing, a simplified schematic diagram in block form of one embodiment of a radio navigation receiver in accordance with the principles of our invention is shown in which each of the blocks comprises circuitry which is well-known to those persons skilled in the art and detailed explanation is believed unnecessary. The signals, shown in Fig. 2, radiated by the beacon are received by antenna 30 which couples the received energy to a usual video detector 31. The output of the video detector 31 comprises the complex signal transmitted by the ground beacon and is coupled to a limiter circuit 32 whose output is fed to a 15 cycle reference signal decoder 33 and to a 135 cycle reference signal decoder 34. In order to reconstruct the envelope wave of the bearing signal, the output of limiter 32 is also fed to a video envelope detector 37 which may comprise pulse widening and peak follower circuits. The circuitry of the decoders 33 and 34 is entirely dependent upon the type of encoding given to the reference signals at the transmitter, for example, pulse time modulation or pulse code modulation or carrier frequency or subcarrier frequencies may be utilized to differentiate between the various transmitted signals, and the decoders 33 and 34 would have their circuitry entirely dependent upon which of the numerous types of encoding is actually utilized.

In any event the output of the video envelope detector 37, shown in Fig. 4, curve A, is coupled to a squaring and pulse forming circuit 38 causing a pulse to be generated each time the detected modulation envelope crosses the axis of zero voltage. The pulse output of circuitry 38 as shown in Fig. 4, curve B, is coupled to a bi-stable multivibrator 36 causing the multivibrator to initiate a cycle. The detected north signal pulse, i. e., the output of the 15-cycle reference signal decoder is coupled to the bi-stable multivibrator 36 causing the action initiated by the "on" pulse from circuit 38 to be halted. Thus, as is shown in Fig. 4, curve D, the bi-stable multivibrator 36, which may be termed the "coarse" multivibrator, is turned on by the variably timed pulse formed from the axis crossing of modulation and is turned off by the north pulse detected by decoder 33. The coarse azimuth indication as represented by the output of bi-stable multivibrator 36 is coupled to a coarse azimuth indicator 39 where it is displayed. The output of pulse forming circuitry 38 is also coupled to a delay multivibrator 40 whose pulse output functions as a starting or "on" pulse for the "fine" bi-stable multivibrator 35. The bi-stable multivibrator 35 is turned "off" by the output of the auxiliary reference signal decoder 34. Thus, as shown by Fig. 4, curve E, the output of the bi-stable multivibrator 35 is turned on by the variable pulse output of pulse forming circuitry 38, which in the first instance has no delay imposed upon it by the delay multivibrator 40, and it is then turned off by the next auxiliary pulse. Delay multivibrator 40 is adjusted to impose successively greater delays upon the output of the pulse forming circuitry 38 before it is coupled to the bi-stable multivibrator 35 until the variable pulse generated by the forming circuit 38 is delayed until it is time coincident with the next auxiliary reference pulse output of decoder 34, as shown in Fig. 4, curve F. This time coincidence condition is indicated by the coincidence meter 41. The amount of time delay necessary to cause the variable pulse to become time coincident with the next auxiliary pulse is measured on the fine azimuth indicator 42 and yields an extremely accurate determination of the azimuth of the light-weight receiver of this invention with respect to the ground beacon.

The underlying principle of this system's ability to determine azimuth accurately lies in the fact that the errors which are established in multivibrator 35 apply only to the 40° intervals between the 135 cycle auxiliary reference pulses and this is a relatively small proportion of the error which would be included in a similar circuit using only the 15 cycle reference pulses and multivibrator 36. For example, it may be helpful to assume that each multivibrator 35 and 36 has inherent within it a 5% error in its timing. Thus, as multivibrator 36 was producing signals covering a measurement of 360° one might expect the error of 18° in its final reading. However, since the output of multivibrator 36 controls a circuit which is expected to be approximately accurate the 5% error is not critical in the radio navigation receiver of this invention whereas it may very well be critical where the comparison of the fundamental reference signal and the fundamental frequency bearing signal is a final determinant of the bearing. In this invention, however, after getting a coarse indication the other multivibrators 25 and 40 are utilized to obtain the bearing within 40° and if this has a 5% error the resultant error in the reading on the fine meter can be expected to be within 2°. Thus instead of an 18° error we have reduced the error factor until it is only 2°.

One advantage obtained by the radio navigation receiver of this invention is apparent when considering the waveform shown in curve A of Fig. 4 of the drawing. Note that the complex waveform 43 crosses the line of zero voltage position with a much steeper slope than the curve 44 representing the fundamental frequency signal. The circuitry of this invention can take advantage of the steep slope of the complex waveform 43 at this point instead of the more gentle slope which is used when the fundamental reference signal is compared with the fundamental bearing signal. Of course it should be clearly understood that the receiver of this invention is not dependent upon the transmission of an harmonic bearing signal although the harmonic bearing signal is preferred, to insure more accurate determination of the axis crossover.

The signals illustrated in Fig. 4 would be received by a receiver at an azimuth to the beacon. By adjusting the delay imposed by multivibrator 40 the pulse output of circuit 38 can be made time coincident with the auxiliary reference pulse output of decoder 34. This would be the equivalent of moving the variable pulse signal. Since this movement is less than 40° a very small reading would be apparent on the coarse dial 39, but when coincidence was reached meter 41 would so indicate responsive to the output of multivibrator 35. The amount of time delay imposed by circuit 40 is proportional to the amount of error in the coarse reading.

While we have described above the principles of our invention in connection with specific apparatus, it is to be clearly understood that this description is made only by way of example and not as a limitation to the scope of our invention as set forth in the objects thereof and in the accompanying claims.

We claim:

1. A radio navigation receiver for indicating the bearing from a receiving point to a beacon emitting a bearing signal as a directional radiation pattern rotating at a predetermined frequency and a first series of reference signals at said predetermined frequency and a second series of reference signals at a frequency harmonically related to said predetermined frequency, said receiver comprising means for detecting said bearing signal emitted by said beacon, means to generate a signal responsive to the phase of said received bearing signal, means to detect said first series of reference signals, means for determining the difference in time between said generated signal and said first series of reference signals, means to detect said second series of reference signals, means for determining the difference in time between said second series of reference signals and said generated signal, means for imposing a time delay upon said generated signal to bring it into time coincidence with the next occurring one of said second series of reference signals and means to measure the time delay imposed upon said generated signal to bring it into time coincidence with the next occurring reference signal of said second series.

2. A bearing indicating receiver for indicating the azimuth from a receiving point to a beacon by means of signals received from said beacon, said signals including a signal having a bearing envelope wave the phase of which is determined by the position of said receiver relative to said beacon and a first and second series of reference signals at a fundamental and harmonic frequency respectively, said receiver comprising means to detect said bearing envelope wave, means to generate a signal responsive to the phase of said received bearing signal, means for detecting said first series of reference signals, means for starting a first timing interval responsive to said generated signal, means for stopping said first timing interval responsive to said detected first series of reference signals, means for detecting said second series of reference signals, means for starting a second timing interval responsive to said generated signal and means for stopping said second timing interval responsive to the next occurring reference signal of said second series.

3. A bearing indicating receiver according to claim 2 which further includes means to impose a time delay upon the generated signal to which said second timing interval is responsive and means to adjust said time delay to cause said second timing interval to be substantially zero.

4. In a radio navigation system having a beacon including a source of radio frequency energy, means for radiating said energy as a directional radiation pattern rotating at a fundamental frequency, means for generating a first series of reference signals at said fundamental frequency and means for generating a second series of reference signals at a frequency harmonically related to said fundamental frequency and means for radiating said reference signals in synchronism with said rotating directional pattern; a bearing indicating receiver comprising means for detecting said rotating directional pattern to obtain a bearing signal wave the phase of which is determined by the azimuth of said receiver to said beacon, means for generating a trigger signal responsive to the phase of said bearing signal wave, means for detecting said fundamental frequency reference signals, means for determining the difference in time between said generated signal and said fundamental frequency reference signals, means for detecting said harmonic frequency reference signals, means for determining the difference in time between said generated signal and the next occurring harmonic frequency reference signal, means to impose a time delay upon said generated signal to bring it into time coincidence with said next occurring harmonic reference signal and means to measure said imposed time delay.

5. In a radio navigation system having a beacon including a source of radio frequency energy, means for radiating said energy as a directional radiation pattern rotating at a fundamental frequency, means for generating a first series of reference signals at said fundamental frequency and means for generating a second series of reference signals at a frequency harmonically related to said fundamental frequency and means for radiating said reference signals in synchronism with said rotating directional pattern; a bearing indicating receiver comprising means for detecting said rotating directional pattern to obtain a bearing signal wave the phase of which is determined by the azimuth of said receiver to said beacon, means for detecting said fundamental frequency reference signals, means to generate a comparison signal responsive to the phase of said bearing signal, means to compare the timing of said fundamental frequency reference signal and said comparison signal, means to detect said harmonic frequency reference signals, means to adjust the timing of said comparison signal to cause time coincidence between said comparison signal and said harmonic frequency reference signal.

6. In a radio beacon system having a source of radio frequency energy, means for pulse modulating said radio frequency energy, means for amplitude modulating said pulse modulated energy, means for radiating said modulated energy in a rotating directional pattern having a first sinusoidal characteristic at a fundamental frequency and a second sinusoidal characteristic at a frequency harmonically related to said fundamental frequency, means for generating a first series of pulsed reference signals at said fundamental frequency and means for generating a second series of pulsed reference signals at a frequency harmonically related to said rotation rate and means for radiating said reference signals in synchronism with the rotation of said pattern; a direction indicating receiver comprising means to separate said fundamental and harmonic frequency reference signals, means to detect the envelope wave of said fundamental and harmonic frequency bearing signals, means to compare the timing of said separated fundamental reference signal and the point of crossover on the voltage axis of the fundamental frequency signal of said envelope wave and means to measure the time difference between said axis crossover point and the next occurring detected harmonic frequency reference signal.

No references cited.